United States Patent [19]

Whitcomb

[11] Patent Number: 4,729,189
[45] Date of Patent: Mar. 8, 1988

[54] SUBIRRIGATION MAT

[75] Inventor: Carl E. Whitcomb, Stillwater, Okla.

[73] Assignee: Lacebark Publications, Stillwater, Okla.

[21] Appl. No.: 914,358

[22] Filed: Oct. 2, 1986

[51] Int. Cl.$^4$ .............................................. A47G 7/00
[52] U.S. Cl. ........................................ 47/39; 47/79; 47/48.5
[58] Field of Search ............... 47/39, 79, 48.5, 62, 47/18, 81, 59; 111/6, 7.4

[56] References Cited

U.S. PATENT DOCUMENTS

| | | | |
|---|---|---|---|
| 2,003,986 | 6/1935 | Witthuhn | 47/39 |
| 2,198,309 | 4/1940 | James | 47/39 |
| 3,053,011 | 9/1962 | Silverman | 47/38 |
| 3,085,364 | 4/1963 | Chapin | 47/1 |
| 3,108,400 | 10/1963 | Wolfe, Jr. | 47/18 |
| 3,783,555 | 1/1974 | Peters | 47/38 |
| 4,077,159 | 3/1978 | Haglund | 47/66 |
| 4,177,604 | 12/1979 | Friesen | 47/62 |
| 4,183,176 | 1/1980 | Barfield | 47/79 |
| 4,255,896 | 3/1981 | Carl | 47/62 |
| 4,347,687 | 9/1982 | Sibbel | 47/79 |
| 4,389,815 | 6/1983 | English et al. | 47/81 |

FOREIGN PATENT DOCUMENTS

| | | | |
|---|---|---|---|
| 2497059 | 7/1982 | France | 47/48.5 |
| 1245581 | 9/1968 | United Kingdom | 47/62 |

Primary Examiner—Robert A. Hafer
Assistant Examiner—Bradley M. Lewis
Attorney, Agent, or Firm—Laney, Dougherty, Hessin & Beavers

[57] ABSTRACT

A subirrigation mat has a substrate covering an area across which several potted plants are to be irrigated. Connected along the substrate are a plurality of channel members upon which the plant containers sit. A main conduit connected at respective open ends of the channel members provides irrigating fluid concurrently to each channel member. This fluid flows through outlet holes in the channel members and into the containers placed above the holes. A valve can be associated with each outlet hole to close it when a container is not placed above the hole. A cup can be associated with each outlet hole or valve to facilitate communication between the hole in the channel member and the hole in the bottom of the container.

20 Claims, 7 Drawing Figures

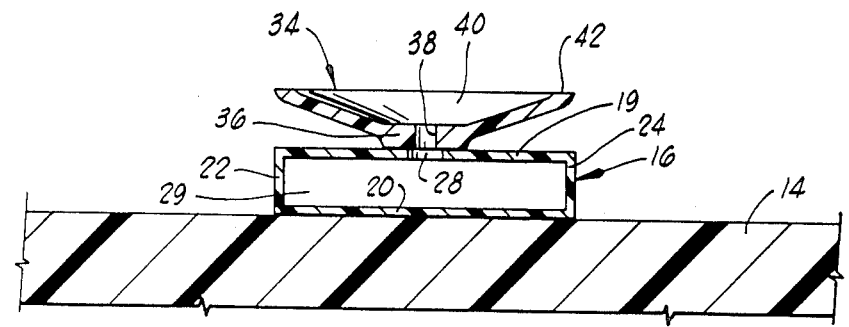
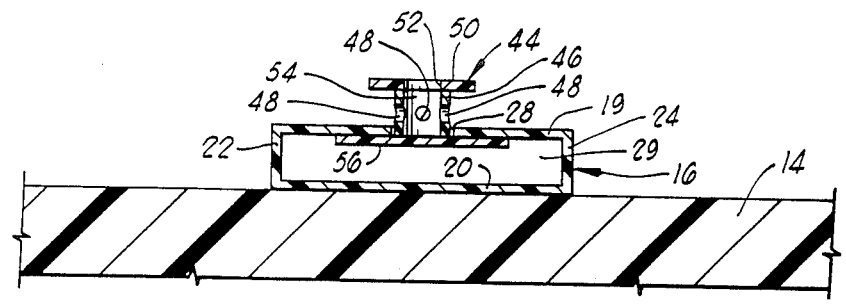
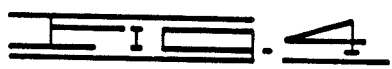
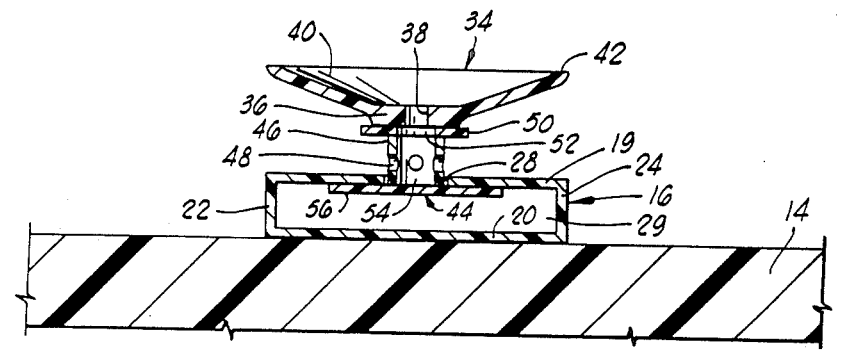
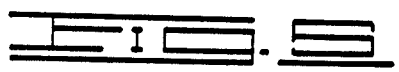

SUBIRRIGATION MAT

BACKGROUND OF THE INVENTION

This invention relates generally to plant irrigation systems and more particularly, but not by way of limitation, to a system for irrigating potted plants from below.

Overhead irrigation of various plants grown in containers out-of-doors is extremely wasteful of water. Published estimates suggest that in excess of 80% of the water pumped does not reach the container, but falls between the containers or on aisles, walkways or roads adjacent the container production area. In areas of winds and low humidity, estimates suggest that as much as 40% of the water discharged by a sprinkler aboveground is lost to evaporation. Losses may be even greater with rapidly turning sprinklers that create very small water droplets, thus increasing the droplet surface area subject to evaporation.

Attempts to water various plants grown in containers with small tubes ($\frac{1}{8}$ to $\frac{1}{4}$ inch in diameter) for individual containers have proven satisfactory for plants on level greenhouse benches. By watering only the growth medium (soil mix) in the container and not the foliage of the plant, many disease problems are reduced or eliminated and the volume of water pumped and carried through the plumbing system is much smaller than with overhead sprinkler irrigation since only the container volume is wetted. Attempts to use this system out-of-doors, however, have generally been unsuccessful for several reasons: (a) rodents (e.g., rats, rabbits and land turtles) repeatedly bite off the small watering tubes; (b) working among the small tubes and containers (such as for pruning, spraying, applying fertilizers, etc.) is awkward; and (c) if a tube is cut by a rodent or pulled from a container by an employee of the plant nursery, generally the plant dies before the problem is noticed.

Attempts to adapt various drip irrigation systems for watering plants grown out-of-doors in containers have also been unsuccessful. These systems generally use plastic pipe about $\frac{1}{2}$-inch in diameter. This eliminates the rodent problem that occurs with smaller tubes; however, the awkward working conditions for employees is increased since a tube must remain over the center of the top of a series or row of containers. Unlike the smaller tubes whose ends are fastened to the growth medium in the container, these larger pipes over the tops of the containers are impractical to fasten to the top of the container or stem of the plant. Polyethylene is the plastic used most, if not exclusively, for this pipe system because of its cost and durability; however, polyethylene undergoes considerable expansion and contraction when heated and cooled. If the drip emitters in the $\frac{1}{2}$-inch drip irrigation pipe on top of the container are positioned over the center of the container for most effective water application to the plant when the pipe is hot, the emitters will be poorly positioned when the water is turned on and the pipe is cooled and contracts. Likewise, if the pipe and emitters are positioned properly when the pipe is cool, when the water is turned off and the pipe heats on a sunny day, the expansion forces the emitters out of proper position. In some cases, the pipe is forced off the side of the container by the expansion. Unless the position of the pipe is checked and repositioned frequently, thereby using much labor, many plants are lost or injured before the problem is corrected.

Researchers and individuals in the business of growing plants in containers out-of-doors in New Zealand and England have devised sand capillary beds that water plants from below. The water rises from the moist sand into the growth medium by the adhesive forces (attraction of water by particle surfaces) and cohesive forces (attraction of water molecule for water molecule) involved in capillary movement. On a small scale and under the mild climatic conditions of New Zealand and England, this watering system works reasonably well; however, shortcomings of this system include: (a) cost of construction; (b) maintenance and periodic replacement of the sand; (c) transplant shock arising from roots which grow out the drain holes of the containers and into the sand; (d) increased water loss from the surface of the sand capillary bed (which can increase water usage to as much as overhead sprinklers) when environmental conditions are appropriate (e.g., low humidity, wind and high temperature); (e) germination of weed seed and growth of weeds on the wet surface between containers; and (f) algae growth which can quickly become unsightly and limit the useful life of the sand.

Capillary mats are used in the greenhouse and florist industries. These are continuous mats of fabric or foam rubber material. An entire mat is wetted—much like the capillary sand beds—and water moves via capillarity up into containers placed on the mat. These mats, regardless of composition, are subject to the same shortcomings as the sand beds.

In view of the foregoing, there is the need for a new type of watering system for plants, particularly those grown out-of-doors, which properly irrigates the plants but which does not exhibit the aforementioned shortcomings.

SUMMARY OF THE INVENTION

The present invention overcomes the above-noted and other shortcomings of the prior art by providing a novel and improved subirrigation system comprising a subirrigation mat which is thin and flexible and upon which the plant containers sit to be irrigated through holes in the bottoms of the containers. Being thin and flexible and having the containers sit on the mat, the irrigating outlets defined in the mat remain properly positioned under the containers. Because the mat is under the containers, it is not subjected to the heating that expands the pipe of the drip irrigation system and thereby displaces the water emitters of that system. The shading of the present invention by the overlying plants sitting on the subirrigation mat increases the useful life of the plastic contemplated to be used in a preferred embodiment of this unique system.

A preferred embodiment of the present invention is also constructed so that fluid conveyed through the subirrigation system is not exposed to light; therefore, algae growth is not a problem, thereby allowing the mat of the system to be used many times. Because the fluid in this subirrigation system is contained, only excess fluid which percolates out of drain holes or otherwise through the containers is subject to evaporation (fluid can, of course, evaporate from the surface of the container growth medium at all times regardless of what type of system is used to supply fluid). A preferred embodiment is also constructed so that the conveyed fluid enters the bases of the containers in such a way that there is very little oxygen in the conduit through which the fluid is conveyed, thereby precluding or limiting root growth out of the containers into the subirrigation system.

The present invention has the advantage of the capillary sand bed used in New Zealand and England; however, it additionally eliminates the shortcomings of relatively large evaporation losses, frequent maintenance and weed removal, and root growth into the irrigation system.

Unlike the small tube system and the drip irrigation system, the irrigation system of the present invention does not interfere with normal work required in a nursery because employees and others can easily walk on the subirrigation mat without tripping or without damaging the system. Furthermore, the present invention keeps the plant foliage dry, thereby reducing or eliminating disease problems. Because the mat of the present invention provides a complete coverage of the soil surface across which the contained plants are grown, no other weed control coverings or chemicals are needed.

Generally, the subirrigation mat of the present invention comprises a substrate and a channel member attached along its length to the substrate. This channel member has a plurality of holes defined along its length, with each respective one of the holes providing a port through which irrigating fluid (e.g., water) can be communicated to a respective container sitting atop the channel member over the respective one of the holes.

In a preferred embodiment, the substrate is a relatively flat sheet and the fluid channel member is a thin, substantially rectangular cross-sectioned tube. There are a plurality of such tubes defining a plurality of channel members which are mounted on the substrate in parallel spaced relationship, with the spacing between the tubes being dependent upon the size of the containers to be placed on them and the desired plant spacing. An individual container or pot would typically sit centered on one tube and contact a tube on either side for support or stability. The space between the tubes allows for rapid drainage of excess irrigating fluid or rain. A single main conduit is connected to open ends of the tubes. The opposite ends of the tubes are closed.

A preferred embodiment of the subirrigation mat further comprises a plurality of cup members, upon which a plurality of containers can sit, each of which cup members is connected to a channel member adjacent a respective one of the holes so that water or other irrigating fluid flowing through the respective hole flows into the interior of the respective cup member. For example, a collapsible cup device defining the cup member can be positioned at the point where the approximate center of a container is to be positioned when the container has a center watering hole in its bottom. The size of the collapsible cup device allows for some inaccuracies in placing the container over the respective outlet of the system. The cup also provides a seal with the bottom of the container. Alternatively, the bottom of the containers could be modified such that they have cup structures which can be easily positioned over the holes in the channel members with sufficient seals being formed to allow the irrigating fluid to pass from the subirrigation system into the containers.

In an alternative embodiment the channel member could be taller than adjacent support members and it could have a thinner top portion than side portions so that a sufficient seal is established between the top portion and a container without requiring the use of the aforementioned cup members.

A preferred embodiment further comprises a plurality of valves, each extending through a respective one of the holes in a channel member and each of the valves movable to a closed position in response to a fluid pressure within the channel member and to an open position in response to a container sitting on top of the respective valve. In the preferred embodiment including the collapsible cup device, the valve may be associated with the collapsible cup.

Therefore, from the foregoing, it is a general object of the present invention to provide a novel and improved subirrigation system. Other and further objects, features and advantages of the present invention will be readily apparent to those skilled in the art when the following description of the preferred embodiments is taken in conjunction with the accompanying drawings.

BRIEF DESCRIPTION OF THE DRAWINGS

FIG. 3 is a sectional elevational view of another preferred embodiment wherein the subirrigation mat includes a collapsible cup.

FIG. 4 is a sectional elevational view showing another preferred embodiment wherein the subirrigation mat includes a valve.

FIG. 5 is a sectional elevational view of another preferred embodiment wherein the subirrigation mat includes a combination of the cup and valve shown in FIGS. 3 and 4.

DESCRIPTION OF PREFERRED EMBODIMENTS

Figure 1:
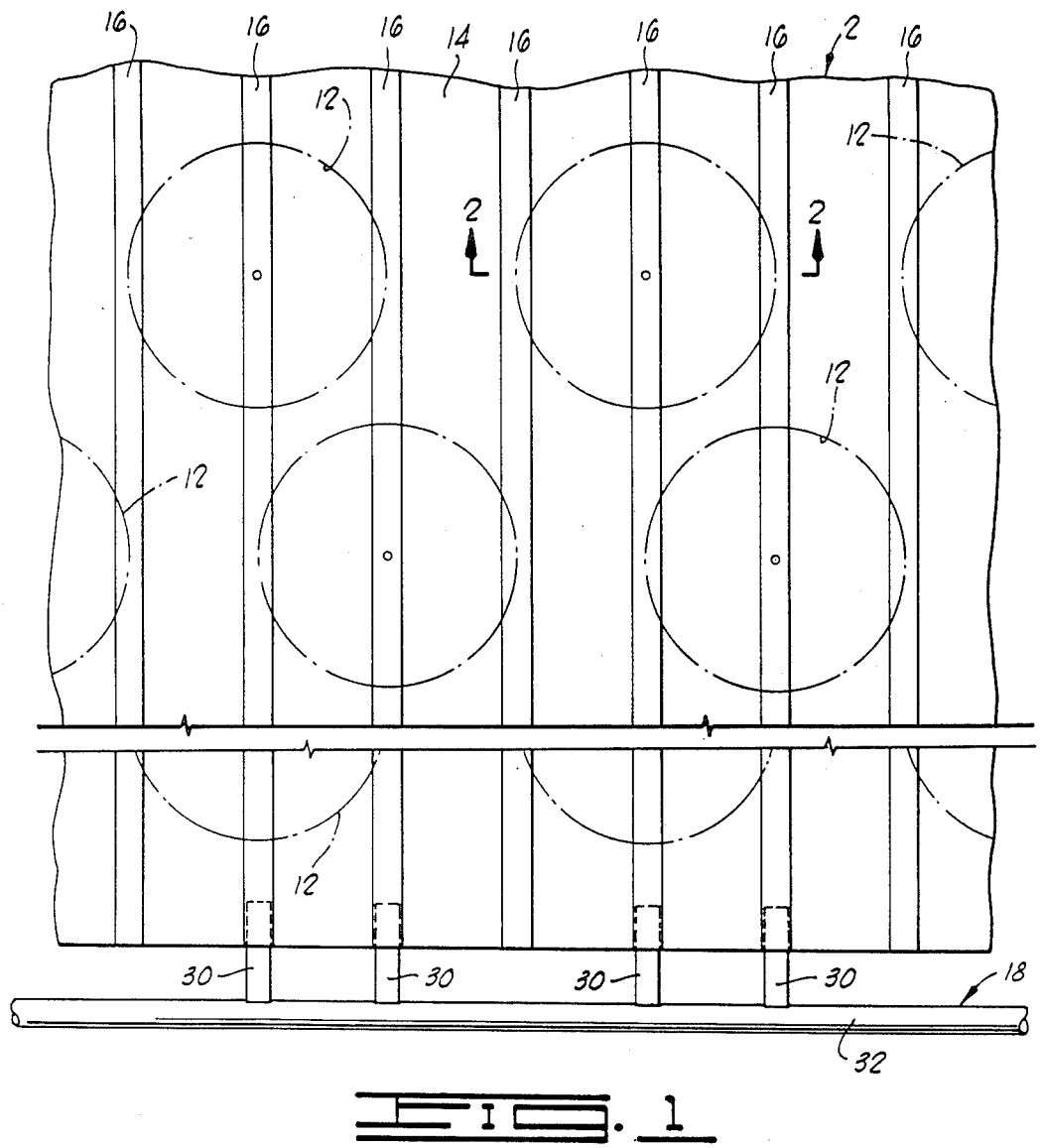
FIG. 1 is a plan view of part of a subirrigation mat constructed in accordance with a preferred embodiment of the present invention.
Figure 2:
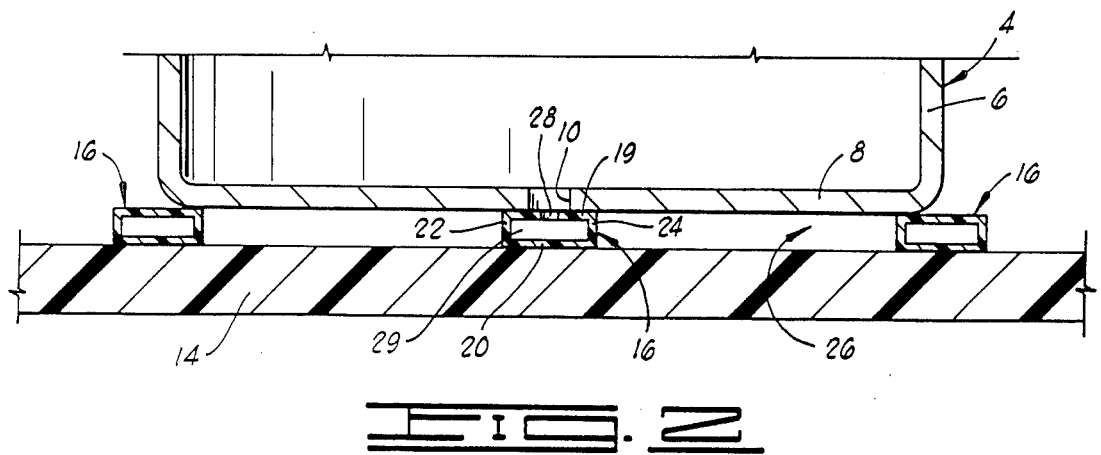
FIG. 2 is a sectional view taken along line 2—2 shown in FIG. 1 and showing a bottom portion of a container sitting atop the subirrigation mat.

A subirrigation mat 2 constructed in accordance with a preferred embodiment of the present invention is shown in FIG. 1. The mat 2 covers a large surface area across which a plurality of containers or pots are to be located for growing plants contained in the containers or pots. A lower portion of one such container or pot is shown in FIG. 2 and is identified by the reference numeral 4. The container 4 has a vertical side wall 6 and a horizontal bottom wall 8 in which a vertical hole 10 is centrally located. Side drainage holes can be formed in the side wall 6 as known to the art. One or more plants and associated growth medium are contained within the cavity or receptacle defined by the walls 6, 8. Water or other irrigation fluid is communicated into this cavity through the hole 10 from a subsequently described enclosed fluid conveying means of the subirrigation mat 2. Such fluid conveying means has holes through one of which the water or other irrigating fluid is communicated to the opening 10.

In the preferred embodiment shown in FIGS. 1 and 2, the subirrigation mat 2 has markings 12 or indicia defining circles corresponding to the circular outer perimeters of the containers 4. The markings 12 are useful in locating the containers 4 on the mat 2 when each hole 10 of a container is to be accurately aligned with a respective one of the outlets or holes defined in the fluid conveying means of the mat 2. Such alignment is illustrated in FIG. 2.

The enclosed fluid conveying means is mounted on a substrate 14 of the mat 2. This enclosed fluid conveying means includes a plurality of channel members 16 disposed on the substrate 14 in parallel, spaced relationship to each other. A main conduit 18 connects with those of the channel members 16 which will be used to transport water (or other irrigating fluid) to containers located above the outlets defined in the channel members 16.

The substrate 14 of the preferred embodiment is a flexible sheet of suitable material, such as a suitable water-repellant plastic. The flexibility of the sheet should be such that it can be rolled up into a substantially cylindrical shape and rolled out into a substantially flat shape. The area of the sheet can be any suitable size; however, the width and length will be greater than the height, which height should be small so that the rolled-up, or other storage, volume of the mat 2 will be a convenient size.

The channel members 16 are connected to the substrate 14 b any suitable means, such as by gluing or being integrally formed therewith as by profile extrusion, for example. The members 16 are constructed substantially identically in the preferred embodiment, except for possible differences in the numbers or locations of the outlet holes. As shown in FIG. 2, each channel member of the preferred embodiment has a top wall 19, a bottom wall 20 and two side walls 22, 24. These are assembled in the preferred embodiment in a substantially rectangular cross section with the side walls 22, 24 being made sturdy enough to support the weight of the containers 4. This prevents the channel member from fully collapsing so that fluid flow through the member 16 is not blocked and so that the bottoms of the containers 4 are held above the surface of the substrate 14 adjacent which is the bottom wall 20 of each channel member 16. By keeping the bottoms of the containers 4 above the substrate, drainage troughs 26 defined between neighboring channel members 16 will not be obstructed, so that rain or excess irrigation fluid, such as that percolating out of the outlet holes which are not covered by containers 4 or through side drainage or other holes (not shown) in the containers 4, can be removed from the vicinity of the irrigated plants. Alternatively to constructing the side walls sufficiently to withstand such weight, upstanding walls extending from the surface of the substrate could be used to provide such support. These walls would be spaced approximately equal to the width of the top and bottom walls 19, 20 so that a slot for receiving the respective channel member 16 would be defined.

As shown in FIGS. 1 and 2, the width of the channel member 16 is substantially less than the width or diameter of the container 4 which sits upon the channel member 16. For example, the cross section of the channel member 16 could be ½ inch by 1 inch, ¼ inch by 2 inches, or similar dimensions. In general, however, the channel member 16 can be of any suitable size, including even being wide enough to support the container 4 by itself.

When three channel members 16 are used to support one of the containers 4, the two outer neighboring channel members 16 are spaced from the inner central supporting member a suitable distance dependent upon the size of the containers and the spacing to be maintained between the plants. The trough 26 is defined by this spacing between the neighboring channel members 16.

Each channel member 16 can have a plurality of holes 28 defined along its length. Each of the holes 28 provides a port or outlet through which water or other irrigating fluid can be communicated to a respective container sitting atop the channel member over the respective hole. In the preferred embodiment, however, every third one of the members 16 is shown as having no such holes. In this configuration such member 16 is used simply as a container support member to support one edge of each container 4 sitting centrally above a neighboring channel member 16 which does have the holes 28. Other configurations are, of course, possible. For example, every other one of the members 16 could be without holes so that a member 16 having holes is in between two parallel members without holes used to support the containers. When the holes 28 are formed in one of the channel members 16, they can be defined therein at spacings relative to the holes 28 of another channel member 16 so that an offset array of holes is created. One such offset array is illustrated in FIG. 1. Other hole locations, however, can be adopted to define other types of arrays.

In the preferred embodiment the channel members 16 are fluid distribution tubes made of a suitable material, such as a flexible plastic, which blocks light from penetrating into interior channels 29 defined throughout the lengths of the tubes. Because light is blocked from entering the channels 29, algae growth is prevented within the flow channels. Each flow channel 29 is closed at one end to prevent the irrigation fluid from flowing out that end of the distribution tube, and it is open at its other end for connecting with a header of the main conduit 18 as shown in FIG. 1.

When the holes 28 are located to form the offset array shown in FIG. 1, this permits one of the channel members 16 to receive a respective plurality of the containers 4, and it permits the neighboring channel member 16 which has the holes 28 defined in offset relationship to receive its own respective plurality of containers 4. In this configuration the respective outer surfaces of the top walls 19 of the respective channel members 16 receive respective portions of peripheries of the other member's plurality of containers as is apparent from the lines 12 overlapping the neighboring channel members 16 shown in FIG. 1. Opposite portions of these containers are supported by the respective neighboring nonperforated ones of the channel members 16.

The main conduit 18 includes a header section which has connectors 30 extending perpendicularly from a single fluid conductor 32. The fluid conductor 32 extends perpendicular to the channel members 16 mounted on the substrate 14. The header connectors 30 are of suitable types known to the art, such as of a construction similar to nylon tees and elbows used on the polyethylene pipe in the aforementioned drip irrigation system. These extensions are suitably threaded or otherwise constructed to engage a portion of the inside surfaces of the walls 19, 20, 22, 24 at the open end of the channel 29 of the respective channel member 16. Thus, this main conduit 18 is connected to the plurality of channel members 16 so that water or other irrigating fluid from one source can be concurrently distributed through the main conduit 18 to each of the channel members 16.

To avoid having to accurately align the hole 10 of a container 4 with a respective hole 28 of one of the channel members 16, another preferred embodiment of the present invention includes a plurality of cup members 34, each of which is connected adjacent a respective one of the holes 28 so that fluid flowing through the respective hole 28 flows into the interior of the respective cup member 34 for communication through the hole 10 of the container 4 sitting on top of the respective cup member. One of these cup members 34 is shown in FIG. 3 as being connected directly adjacent the top wall 19 of one of the channel members 16. Each cup member 34 has a bottom wall 36 through which an opening 38 is defined. The bottom wall 36 is connected to the top wall 19 of the respective channel member 16 so that the opening 38 is aligned with one of the holes 28 in the respective channel member 16. Extending at an oblique angle from the bottom wall 36 is a conical side wall 40 terminating in an outer circular periphery 42. As is apparent from FIG. 3, the periphery 42 extends well beyond the periphery of the hole 28 so that a much larger area for communicating with the hole 10 in the container 4 is provided. The periphery 42 engages the bottom surface of the container 4 in a sealing manner so that fluid flowing through the hole 28 and the opening 38 will not spill out over the periphery 42 when the container 4 sits on the cup member 34. The cup member 34 is made of any suitable material; however, in the preferred embodiment it is preferably of a flexible type which is collapsible when the container 4 is placed on the cup member 34.

One contemplated alternative to the cup member 34 being connected to the channel member 16 is to change the design of the bottom of the container 4 so that it has a suitable cup-like member which is more easily alignable with the hole 28 than just the hole 10 alone.

Still another embodiment of the present invention is shown in FIG. 4. This embodiment utilizes valve means for controlling the flow of fluid through the holes 28 defined in the channel member 16. A plunger-type valve 44 defining this valve means is shown in FIG. 4. This valve 44 has a hollow cylindrical valve body 46 in which a plurality of apertures 48 are defined. An upper annular sealing flange 50 extends beyond the periphery at one end of the valve body 46 so that the upper sealing flange 50 engages the outer surface of the top wall 19 of the respective channel member 16 adjacent the hole 28 when one of the containers 4 sits on the upper sealing flange 50. An opening 52 defined through the flange 50 communicates with an open interior region 54 of the valve body 46. A lower circular sealing flange 56 extends beyond the periphery at the other end of the valve body 46 so that the lower sealing flange 56 engages an inner surface of the top wall 19 of the respective channel member 16 adjacent the hole 28 in response to a pressure within the channel 24 of the channel member 16 when the container 4 does not sit on the upper sealing flange 50. Thus, when the container 4 sits on the flange 50, the valve 44 is moved downwardly (as viewed in FIG. 4) until the openings 48 lie within the channel 29 of the channel member 16 and the flange 56 is separated from its sealing engagement with the top wall 19. This allows fluid flow from within the channel 4 through the apertures 48 for communication through the opening 52, above which the hole 10 of the container 4 is located. When the container 4 is removed from the flange 50, the irrigating fluid pressure, if any, within the channel 29 will act on the larger lower surface of the flange 56 to move the valve to its closed position illustrated in FIG. 4.

The use of such valve may not always be needed, such as in the case of a wholesale producer who will generally fill the entire expanse of a mat at a time; however, such valve may be desirable for someone such as a retailer who will not fill the entire mat at any one time and who wants to avoid having the unused holes emit water when the other holes are being used to water plants.

An embodiment is shown in FIG. 5 wherein both the cup member 34 and the valve 44 are combined to provide the advantages of both in a single embodiment. The elements of this combination are the same as shown in FIGS. 3 and 4 as indicated by the same reference numerals. In the FIG. 5 embodiment the bottom wall 36 of the cup member 34 is mounted on top of the flange 50 of the valve 44.

In using the embodiment shown in FIG. 1, the containers 4 can be located on whichever ones of the holes 28 are needed. Alignment of the holes 10 with the holes 28 is facilitated by using the indicia 12 marked on the substrate 14 and the respective ones of the channel members 16. With the containers 4 so positioned, the holes 10, 28 are aligned. The main conduit 18 is connected as shown in FIG. 1 and an irrigating fluid, such as water, is flowed from a common source, such as a water main. Such fluid flows through the main conduit 18, through the channels 29 of the channel members 16 and out the holes 28. The flow through the holes 28 then moves by capillarity into the growth media in the containers 4 having their holes 10 aligned with the holes 28. This concurrently irrigates all of the plants.

Wasted water from unused ones of the holes 28 can be eliminated by utilizing the valves 44, and the association of the containers 4 with the channel members 16 can be facilitated by using the cups 34.

Regardless of which particular embodiment is used, any excess irrigating fluid or rain communicated onto the mat is channeled for removal through the drainage troughs 26 defined by the spaced channel members 16 and the substrate 14 on which the channel members 16 are mounted.

Figure 6:
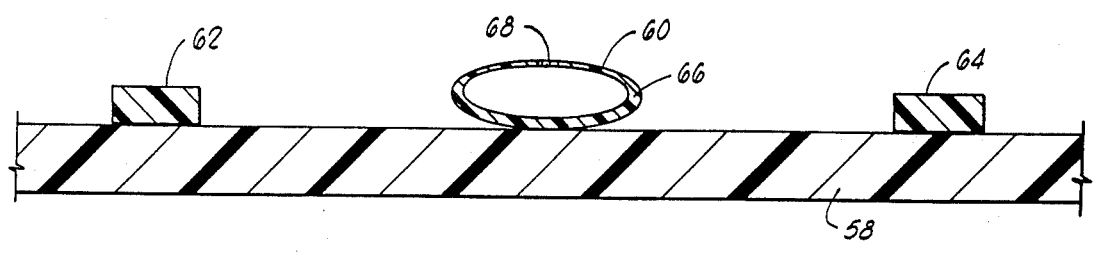
FIG. 6 is a sectional elevational view of another preferred embodiment wherein the subirrigation mat includes a more rounded fluid-conducting channel member.
Figure 7:
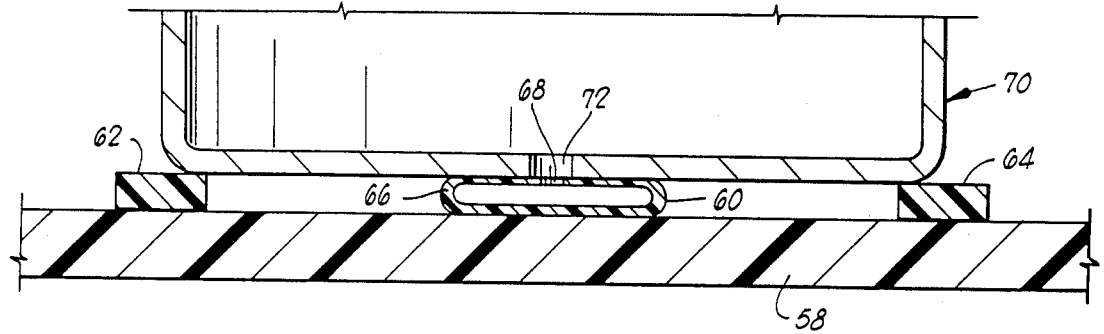
FIG. 7 is a sectional elevational view of the embodiment shown in FIG. 6 with a container placed on it.

Still another embodiment of the subirrigation mat 2 of the present invention is illustrated in FIGS. 6 and 7. Although the components and construction of this embodiment may in many respects be identical or similar to the embodiments shown in FIGS. 1–5, different reference numerals will be used to describe the embodiment shown in FIGS. 6 and 7 for purposes of convenience. The portion of the embodiment shown in FIGS. 6 and 7 is repeated in adjacent portions (not shown) to define the overall mat 2 of whatever size is desired. Each of these sections, however, includes in this embodiment the same components shown in FIGS. 6 and 7. In the illustrated embodiment these sections are integral; however, separable sections could be used in this and the other described embodiments.

The components of the embodiment shown in FIGS. 6 and 7 include a substrate 58 which can be of a type identical to the substrate 14 of the previously described embodiments. Shown attached to or formed with the substrate 58 are a channel member 60 and two parallel support members 62, 64.

The channel member 60 comprises a side wall 66 of varying thickness which defines an oval cross section when no container is placed on the channel member 60 as illustrated in FIG. 6. The side wall 66 has its thicker portions along the bottom and sides of the oval cross section and its thinner portion along the top. Through this thinner portion a plurality of holes 68, similar to the holes 28 of the previous embodiments, are defined. This thinner portion allows the channel member 60 to form a sufficient seal with the bottom of a container 70 placed on top of the channel member 60 as shown in FIG. 7 with a bottom hole 72 of the container 70 aligned with one of the holes 68 of the member 60. This sufficient seal obviates the need for the likely more expensive cup design shown in the embodiments illustrated in FIGS. 3 and 5. When the container 70 is placed on top of the channel member 60, it compresses it to the shape shown in FIG. 7 because the channel member 60 in the embodiment of FIGS. 6 and 7 has a greater height than the support members 62, 64.

It is to be noted that any suitable design for the channel members can be used. For example, the channel member 60 might be made to have a more square or rectangular cross section, but still one having relatively thicker side portions than the top portion so that the thicker side portions are strong enough to avoid collapsing when a container is placed on the channel member and so that the thinner top portion provides a sufficient seal with the bottom of the container to obviate the need for a more elaborate cup assembly of the type shown in FIGS. 3 and 5. The channel member is preferably higher than any adjacent support members so that the sealing is enhanced due to the compressing or depressing of the channel member by the container when the container is placed and supported on the shorter support members as illustrated in FIG. 7.

The support members 62, 64 can be solid members of the type illustrated in FIGS. 6 and 7 or they can be of any suitable alternative design. For example, they could be fluid conducting channel members or they could be more rib-like members having smaller widths than the embodiment shown in FIGS. 6 and 7. The principal feature of the support members 62, 64 for the embodiment shown in FIGS. 6 and 7 is that they both have shorter heights than the height of the channel member 60 measured from the upper surface of the substrate 58 to the opposite surfaces of the support members 62, 64 and the top of the channel member 60 through which the openings 68 are defined, respectively.

The embodiment shown in FIGS. 6 and 7 is used in a manner similar to the embodiment shown in FIG. 2.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. A subirrigation mat, comprising:
   a flexible substrate adapted to be rolled up into a substantially cylindrical shape and rolled out into a substantially flat shape; and
   a channel non-removably attached along its length to said substrate, said channel member having a plurality of holes defined along its length, each respective one of said holes providing a port through which irrigating fluid can be communicated to a respective container sitting atop said channel member over the respective one of said holes.

2. A mat as defined in claim 1, further comprising a plurality of cup members, upon which a plurality of pots can sit, each of said cup members connected to said channel member adjacent a respective one of said holes so that fluid flowing through the respective hole flows into the interior of the respective cup member.

3. A mat as defined in claim 2, further comprising a plurality of valves connected to said plurality of cup members, each of said valves extending through a respective one of said holes so that each valve is movable between open and closed positions in response to whether a respective container sits on the respective cup member to which the respective valve is connected.

4. A mat as defined in claim 1, further comprising a plurality of valves, each extending through a respective one of said holes and each of said valves movable to a closed position in response to a fluid pressure within said channel member and to an open position in response to a container sitting on top of the respective valve.

5. A mat as defined in claim 1, further comprising a container support member attached along its length to said substrate in parallel, spaced relation to said channel member.

6. A mat as defined in claim 5, wherein said support member is characterized as another channel member having a plurality of holes defined along its length.

7. A mat as defined in claim 1, wherein:
   said channel member has a closed end and an open end; and
   said mat further comprises a main conduit connected to said open end of said channel member.

8. A mat as defined in claim 1, wherein said channel member has a side wall of varying thickness defining an oval cross section when no container is sitting atop said channel member.

9. A subirrigation mat for irrigating plants contained in a plurality of containers, each of which containers has a hole in its bottom, said mat comprising:
   a flexible sheet; and
   a plurality of channel members non-removably connected to said sheet, at least two of said channel members disposed in parallel, spaced relation so that a drainage trough is defined along said sheet between said at least two channel members, and each of said channel members having a plurality of holes defined therein so that fluid can flow from the respective channel member into containers disposed above the respective channel member with the holes in the bottoms of the containers in communication with said holes in the respective channel member.

10. A mat as defined in claim 9, further comprising a main conduit connected to said plurality of channel members so that irrigating fluid from one source can be distributed through said main conduit to each of said channel members.

11. A mat as defined in claim 9, further comprising valve means for controlling the flow of fluid through a respective one of said holes defined in a respective one of said channel members.

12. A mat as defined in claim 9, further comprising a cup member extending from one of said of one of said channel members, said cup member having an outer periphery exceeding the periphery of said one of said holes of said one of said channel members.

13. A mat as defined in claim 12, wherein said cup member includes:
   a bottom wall having an opening defined therethrough and aligned with said one of said holes of said one of said channel members; and a side wall extending at an oblique angle from said bottom wall.

14. A mat as defined in claim 13, further comprising valve means for controlling the flow of fluid through a respective one of said holes defined in a respective one of said channel members.

15. A subirrigation mat for watering plants in containers, comprising:
- a flexible sheet having a width and a length greater than its height;
- a first water channel member non-removably connected to said sheet, said first water channel member having a plurality of holes defined at spaced intervals along the length thereof so that a first plurality of containers can receive water from said first water channel member from below the containers; and
- a second water channel member non-removably connected to said sheet, said second water channel member having a plurality of holes defined at spaced intervals along the length thereof in offset relation to said holes defined in said first water channel member so that a second plurality of containers can receive water from said second water channel member from below the containers.

16. A mat as defined in claim 15, wherein:
said first water channel includes an outer surface extending between said plurality of holes defined in said first water channel member so that at least portions of said outer surface of said first water channel member receive respective portions of peripheries of said second plurality of containers when said second plurality of containers sit on said second water channel member; and
said second water channel member includes an outer surface extending between said plurality of holes defined in said second water channel member so that at least portions of said outer surface of said second water channel member receive respective portions of peripheries of said first plurality of containers when said first plurality of containers sit on said first water channel member.

17. A mat as defined in claim 15, further comprising a main conduit connected perpendicularly to said first and second water channel members.

18. A mat as defined in claim 15, further comprising a third water channel member connected to sheet in parallel, spaced relation to said second water channel member and on the side of said second water channel member opposite said first water channel member, said third water channel member having an outer surface upon at least portions of which said outer surface portions of said second plurality of containers sit when said second plurality of containers sit on said second water channel.

19. A mat as defined in claim 15, wherein said first and second water channel members are flexible so that said mat can be rolled up into a substantially cylindrical shape and so that said mat can be rolled out into a substantially flat shape.

20. A mat as defined in claim 15, further comprising:
- valve means for controlling the flow of water through a respective one of said holes defined in a respective one of said water channel members; and
- a cup member extending from one of said holes of one of said water channel members, said cup member having an outer periphery exceeding the periphery of said one of said holes.

* * * * *

UNITED STATES PATENT AND TRADEMARK OFFICE
CERTIFICATE OF CORRECTION

PATENT NO. : 4,729,189
DATED : March 8, 1988
INVENTOR(S) : Carl E. Whitcomb

It is certified that error appears in the above-identified patent and that said Letters Patent are hereby corrected as shown below:

Column 3, line 3, change "advantage" to --advantages--;
Column 5, line 23, change "b" to --by--;
Column 5, line 42, change "irrigation" to --irrigating--;
Column 9, line 58 (claim 1), after "channel" and before "non-removably", insert --member--;
Column 10, line 60 (claim 12), after the first occurrence of "said" and before "of", insert --holes--;
Column 11, line 27 (claim 16), after "channel" and before "includes", insert --member--; and
Column 12, line 13 (claim 18), after "to" and before "sheet", insert --said--.

Signed and Sealed this

Twelfth Day of July, 1988

Attest:

DONALD J. QUIGG

*Attesting Officer*　　　　*Commissioner of Patents and Trademarks*